March 6, 1956 G. E. SANDERSON 2,737,051
PRESSURE MEASURING DEVICE
Filed Sept. 23, 1950 2 Sheets-Sheet 1

INVENTOR.
GLEN E. SANDERSON
BY
George C. Sullivan
Agent

March 6, 1956  G. E. SANDERSON  2,737,051
PRESSURE MEASURING DEVICE
Filed Sept. 23, 1950  2 Sheets-Sheet 2

INVENTOR.
GLEN E. SANDERSON
BY
George A. Sullivan
Agent

United States Patent Office 2,737,051
Patented Mar. 6, 1956

2,737,051

PRESSURE MEASURING DEVICE

Glen E. Sanderson, Glendale, Calif., assignor to Lockheed Aircraft Corporation, Burbank, Calif.

Application September 23, 1950, Serial No. 186,399

7 Claims. (Cl. 73—398)

This invention relates to pressure responsive or pressure measuring devices and relates more particularly to devices for measuring fluid pressures and other variable forces. It is an object of the invention to provide a simple, inexpensive and practical device for determining or measuring fluid pressures and the like.

Another object of the invention is to provide a device of this character that is small, compact and light in weight and, therefore, well adapted for use on aircraft and in other situations where the small size and weight of such devices are important considerations. The pressure pickup unit of the present invention is characterized by its small dimensions and extremely low overall weight.

Another object of the invention is to provide a pressure pickup incorporating electrical strain gauges connected in the arms of a bridge circuit and characterized by a novel support or beam carrying the strain gauges and mounted and constructed so that the arms of the beam which carry the strain gauges are flexed or deflected by the variable fluid pressure, or other force being measured, acting upon a diaphragm or bellows to thereby vary the resistance in the strain gauge circuit and thus permit a remote reading or recording of the fluid pressure or measured force.

Another object of the invention is to provide a pressure measuring device of the character described embodying an adjusting means whereby an identical electrical output can be obtained from a plurality of the pickup units subjected to identical pressures to assure a like or identical calibration or setting of the several units. A simple, readily accessible adjustment is provided for the pressure pickup unit to regulate the force or stress on the strain gauge beam to assure accurate operation of the device.

A further object of the invention is to provide a pressure measuring device that is accurate throughout a wide range of fluid pressures, or other variable forces, to vary the current or voltage of a circuit in a manner proportional to the pressure variations being measured.

Other objectives and features will become apparent from the following detailed description of a typical embodiment of the invention in which.

Figure 1:
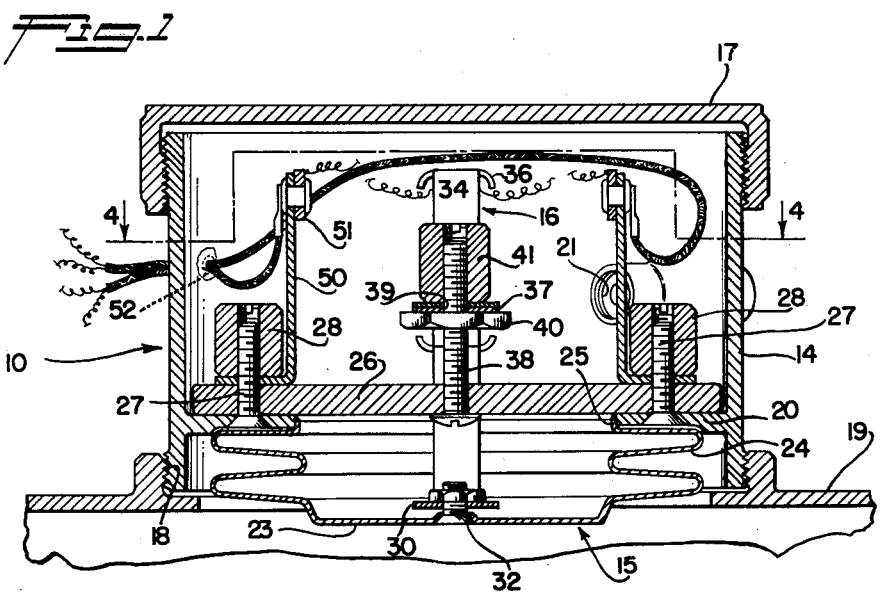
Figure 1 is an enlarged longitudinal sectional view of the pressure pickup unit taken as indicated by line 1—1 on Figure 4.

The present invention provides a pickup unit 10, a power supply 11 and a remote indicator or recorder 12 which may or may not require a suitable amplifier 13, the unit 10 being connected between the power source 11 and the meter or recorder 12 to vary or influence the circuit in accordance with the variable pressures to which the unit is subjected. The pressure sensitive unit 10 may be said to comprise, generally, a housing or case 14, a diaphragm or bellows 15 supported in the case 14 to be exposed to the pressure to be measured, a beam 16 in the case associated with the bellows 15 to be bent or deflected upon movement thereof, and strain gauges A, B, C and D connected in the circuit between the power supply 11 and the recorder 12 and associated with the beam 16 to be actuated upon flexure or deflection of the same.

Figure 4:
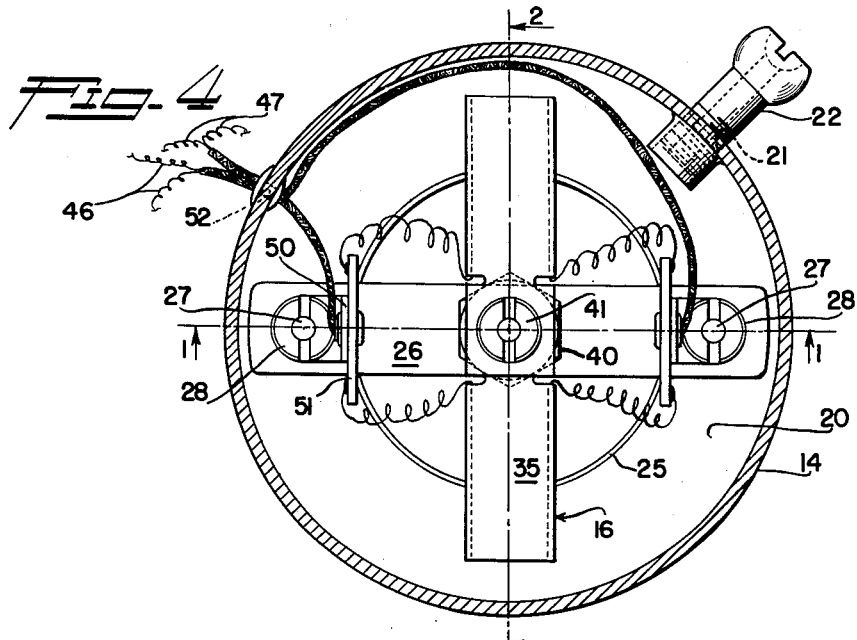
Figure 4 is an enlarged transverse sectional view of the pickup unit, being a view taken substantially as indicated by line 4—4 on Figure 1.

The case 14 may be of practically any selected material and construction. In the embodiment illustrated, the case 14 is a hollow or tubular member provided at one end with a threaded-on cap 17 which may be readily removed to give free access to the parts contained within the case. The other end of the case 14 is adapted to be associated with the structure or part containing or applying the pressure or force to be measured. In the simple arrangement illustrated, this end of the case 14 is externally screw-threaded so that it may be removably or permanenlty secured in an opening 18 in a member 19 which may be considered as conducting or containing the fluid under pressure to be measured, it being apparent that the case 14 may be arranged or mounted in other manners relative to the pressure source. An internal annular shoulder or flange 20 is provided in the case 14 adjacent the member 19 and serves as a mounting or support for the internal elements of the pickup unit 10. Where the device is to be employed to measure a fluid pressure, the wall of the case 14 has a port or opening 21 for placing the interior of the case in communication with a reference pressure, such as atmospheric pressure, static pressure, or the like. As best illustrated in Figure 4, a tube 22, having a flared or enlarged head, may be threaded in the opening 21 to facilitate the connection of a hose or tube, not shown, with the hollow case 14.

The means for transmitting the force or pressure of the fluid to the beam 16 to deflect the same, may take the form of a diaphragm, or the like. However, I have shown a sylphon-type bellows 15 for this purpose. The bellows 15, which is preferably formed of Phosphor-bronze, or the like, has a substantially flat end 23 exposed to the fluid pressure to be measured, and has a series of peripheral corrugations 24. The rear or innermost corrugation 24 rests against the above described flange 20 and has a lip 25 brazed, soldered, welded, or otherwise secured and sealed to the internal surface of the flange. With this arrangement the end face 23 of the bellows is exposed to the fluid pressure in the member 19 while the interior of the bellows 15 is open to the interior of the case 14 and is therefore in communication with the reference pressure tube 22.

The beam 16, for carrying the electrical strain gauges A, B, C and D, is connected between the flexible bellows 15 and a rigid or stationary part of the case 14 to have certain of its portions flexed or deflected by variations in the pressure of the fluid acting upon the bellows 15. The stationary part in the case 14 to which the bellows 15 is secured or anchored, is in the nature of a bridge support 26. The support 26 extends transversely or diametrically across the flange 20 to have its opposite ends engage the inner surface of the flange. Screws 27 and nuts 28 secure the support 26 to the flange 20. The beam 16 is an important element of the pickup unit 10 and is constructed and arranged to have certain of its parts or portions bend or deflect upon variations in the pressure being measured. I have found it desirable to construct the beam 16 of stainless steel, or the like, and in practice the beam may be formed from a single length of such material.

Figure 2:
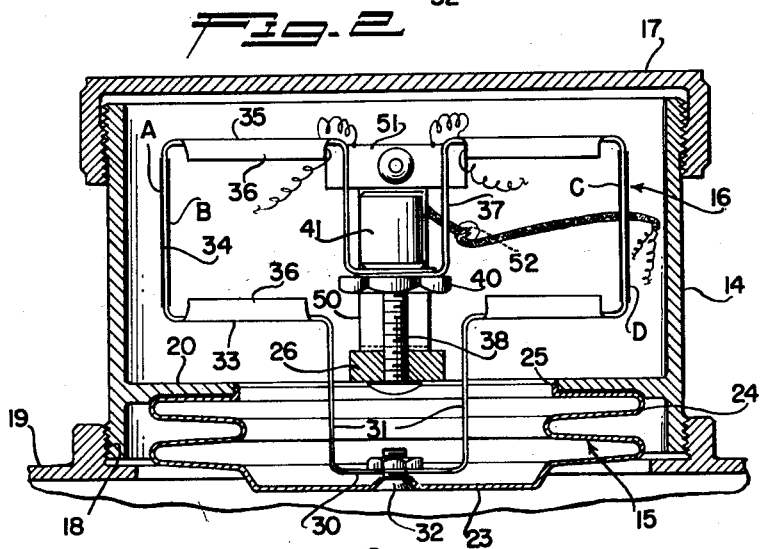
Figure 2 is an enlarged longitudinal sectional view of the pickup unit taken as indicated by line 2—2 on Figure 4, with the strain gauge beam appearing in side elevation.

The beam 16 has the configuration of a hollow T when viewed as in Figure 2, the stem of the T comprising an end part 30 and two spaced side parts 31. The end part 30 is secured to the end wall 23 of the bellows 15 by a flush head screw and nut connection 32, the connection preferably being locked by silver solder. The spaced side parts of the T stem extend substantially perpendicular with reference to the flat end 23 of the bellows 15 and their rear or outer extremities join the head of the T. The head of the T shaped beam 16 is made up of parts or cross pieces or cross bars 33 extending perpendicularly outward from the stem parts 31, side parts or flexible straps 34 extending substantially parallel with the stem of the T although spaced outwardly therefrom, and two head parts or cross pieces or cross bars 35 extending toward one another in spaced parallel relation to the parts 33. The beam parts 33 and 35 are provided with inturned edge flanges 36 which resist bending or deflection of these parts. However, the side parts 34 of the T head are devoid of such stiffening flanges and are designed to deflect or bend upon the application of varying fluid pressures to the bellows 15. It is these side parts 34 which carry the electrical strain gauges A, B, C and D, as will be more fully described. Between the two head parts 35 the beam 16 has a flexible U shaped portion or bracket 37 which is essentially the L-shaped end members of beam 16 as shown in the drawing and which extends inwardly or toward the bridge support 26. The bottom of this U portion 37 is formed from the end parts of the metal strip of which the beam 16 is constructed and these end parts are overlapped and are rigidly secured together as by silver solder or the like.

In accordance with the invention the beam 16 has an adjusting means so that the unit 10 may be given a selected or "zero" stress setting, the adjustment being such that a plurality of the units 10 may be set to give identical electrical outputs under identical pressure conditions. This adjusting means comprises a screw or stem 38 anchored or fixed to the support 26 and passing outwardly through an opening 39 in the above described bottom of the U 37 of the beam 16. A nut 40 is threaded on the stem 38 to engage the under surface of the U portion 37 and a barrel nut 41 is threaded on the stem to cooperate with the upper surface of the U portion 37. The nuts 40 and 41 are shaped and proportioned so that they may be readily engaged by holding and turning tools introduced through the end of the case 14 when the cap 17 is removed. It will be seen how the nuts 40 and 41 may be adjusted along the stem 38 to provide any initial stress or deflection in the beam 16. With the beam 16 constructed and arranged as just described, the side parts 34 bend or deflect in response to forces or pressures applied to the diaphragm 15 while the beam parts 33 and 35 as well as the other portions of the beam are subjected to a minimum of deflection. It is to be observed that a bending moment is applied to each end of each part 34 so that there is uniform bending throughout each part 34, the parts 34 being located between the relatively rigid parts 33 and 35. Thus the beam 16 may be termed a constant bending moment beam.

Figure 3:
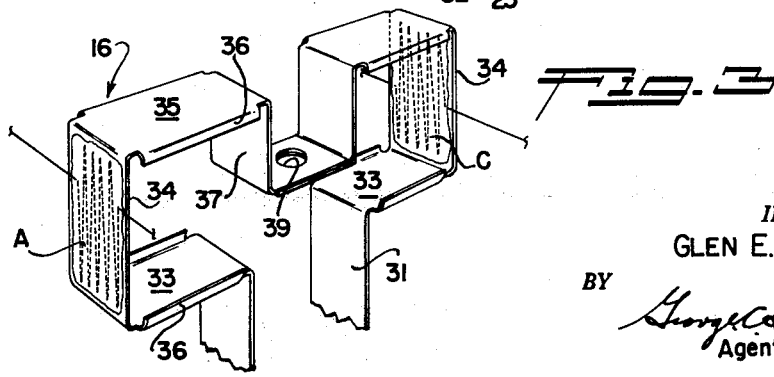
Figure 3 is a fragmentary perspective view of the beam.

The electrical strain gauges A, B, C and D, each comprise a continuous metallic conductor or filament whose resistance varies in accordance with changes in strain in the same. The filaments or wires of the strain gauges may be formed of "Constantan" or other copper-nickel alloys having good electrical resistance properties and having known strain sensitivities. The diameter of the filament may vary between .0001" and .0003" and the filaments are secured on the side surfaces of the beam parts 34. The strain gauge filaments are insulated from the beam 16 by a non-conductive lacquer, a thin layer of mica or the like, and may be secured to the beam by an adhesive or cement such as "Duco" cement and, if desired, then sprayed or brushed with one or more coats of glyptal cement or lacquer, which is subsequently baked. The present invention is not primarily concerned with the specific manner of securing, protecting or insulating the strain gauges A, B, C and D and any of the procedures now well known in the art may be employed. Furthermore, the invention is not limited to the use of any given type of strain gauge, for example electrodeposited strain gauges may be utilized if desired instead of the wire or filament type above described. The wires or elements of the strain gauges A, B, C and D are trained or wound back and forth and, as illustrated in Figure 3, are arranged with their major portions extending longitudinally of the beam parts 34 to have maximum sensitivity to lateral deflection of the beam parts.

Figure 5:
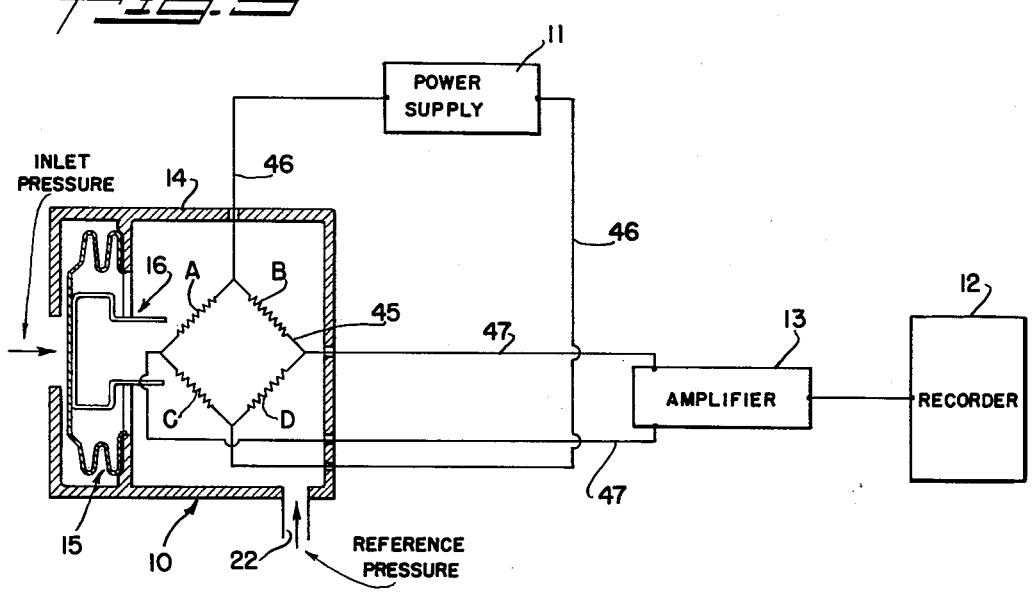
Figure 5 is a wiring diagram of the electrical circuits embodied in the measuring device, the pressure pickup unit being illustrated in a schematic or diagrammatic manner.

The strain gauges A, B, C and D are electrically related and associated with the beam parts 34 to produce the maximum variation in resistance in the electrical circuit with a given deflection or bending of the beam 16. As diagrammatically illustrated in Figure 5, there is a bridge circuit 45 connected between the power supply 11 and the amplifier 13 with two leads 46 connected with opposite terminals of the bridge circuit and extending to the power supply 11 and two leads 47 extending to the amplifier 13 and connected with the other two terminals of the bridge. The strain gauges A and B are secured on the outer and inner surfaces respectively of one beam part 34 and are interposed in adjacent arms of the bridge circuit 45 with one lead 46 of the power supply tapped into the bridge between these arms. The strain gauges C and D are on the inner and outer surfaces respectively of the other beam part 34 and are interposed in the other two arms of the bridge circuit 45 with the other power supply lead 46 connected with the terminal of the bridge that is at the junction of these two bridge arms. With this relationship a given deflection or bending of the beam arms 34 results in the imposition of tension on the gauge A, compression on the gauge B, tension on the gauge D and compression on the gauge C, and the resistance changing action of the gauges in the bridge circuit 45 is additive providing a maximum reading or record at the recorder 12. Where desired or required, any suitable form of amplifying circuit 13 may be employed and the recorder 12 may be of the oscillographic type or of any other selected form.

Clips 50 are secured under the nuts 28 and carry insulated terminal blocks 51 for the electrical leads 46 and 47 and the portions of these leads which extend to to the strain gauges A, B, C and D may be relatively fine or light wires appropriately insulated with lacquer, or the like. Leads 46 and 47 may pass through an opening 52 in the wall of the case 14.

From the foregoing detailed description it will be seen that I have provided a simple, inexpensive pressure sensing or pressure translating device. The unit 10 may be extremely small and light in weight well adapting it for use on aircraft and in like situations. In practice the case 14 of the unit 10 may be approximately 1¼" in diameter and about ¾" in length and the unit may weigh only a few ounces. As above described, deflection of the bellows 15 by a variation in the pressure being measured produces a proportional deflection of the side parts 34 of the beam 16 and this latter deflection results in the application of compression and tensile forces to the strain gauges A, B, C and D, to vary the resistance in the circuit leading to the recorder 12 to provide a maximum reading or record at the recorder. Also, as has been previously described, the unit 10 may be adjusted by operation of the nuts 40 and 41 to give the unit 10 an initial "zero" reading or desired setting.

Having described only a typical form of the invention I do not wish to be limited to the specific details herein set forth, but wish to reserve to myself any variations or modifications that may appear to those skilled in the art and fall within the scope of the following claims.

I claim:

1. A pressure measuring instrument comprising a casing and a base support, a flexible L-shaped member one leg of which is connected to said base suport, a rigid cross bar secured to the other leg of said L-shaped member and at right angles thereto, pressure sensing means secured to said casing and operable in a plane coincident with said other leg of said L-shaped member, a second rigid cross bar extending in a plane parallel to said first mentioned cross bar and connected to said pressure sensing means, and a flexible strap having strain gauges arranged to sense bending secured to both the inner and outer sides of said strap and connecting the ends of said cross bars and extending perpendicular to said cross bars.

2. A pressure measuring instrument comprising a base support, a flexible L-shaped member one leg of which is connected to said base support, a rigid cross bar secured to the other leg of said L-shaped member and at right angles thereto, pressure sensing means secured to said base support and operable in a plane coincident with said other leg of said L-shaped member, a second rigid cross bar extending in a plane parallel to said first mentioned cross bar and connected to said pressure sensing means, and a flexible strap having strain gauges arranged to sense bending secured to both the inner and outer sides of said strap and connecting the ends of said cross bars and extending perpendicular to said cross bars.

3. A pressure measuring instrument comprising a base support, a flexible U-shaped bracket connected at its center to said base support, rigid cross bars secured to the legs of said U-shaped bracket and at right angles thereto, pressure sensing means secured to said base support and operable in a plane coincident with said legs of said U-shaped bracket, second rigid cross bars extending in a plane parallel to said first mentioned cross bars and connected to said pressure sensing means, and flexible straps having strain gauges arranged to sense bending secured to both the inner and outer sides of said straps and connecting the ends of said cross bars and extending perpendicular to said cross bars.

4. A pressure measuring instrument as in claim 3 having means associated with said base support for adjusting the height thereof.

5. A pressure measuring instrument comprising a casing and a base support, a flexible U-shaped bracket connected at its center to said base support, rigid cross bars secured to the legs of said U-shaped member and at right angles thereto, pressure sensing means secured to said casing and operable in a plane coincident with said legs of said U-shaped bracket, second rigid cross bars extending in a plane parallel to said first mentioned cross bars and connected to said pressure sensing means, and flexible straps having strain gauges arranged to sense bending secured to the inner and outer sides of said straps and connecting the ends of said cross bars and extending perpendicular to said cross bars.

6. A pressure measuring instrument as in claim 5 having means associated with said base support for adjusting the height thereof.

7. A pressure measuring instrument comprising a casing and a base support, a flexible L-shaped member one leg of which is connected to said base support, a rigid cross bar secured to the other leg of said L-shaped member and at right angles thereto, pressure sensing means comprising a bellows having a closed end, said bellows having its open end secured to said casing, said bellows operable in a plane coincident with said other leg of said L-shaped member, a second rigid cross bar extending in a plane parallel to said first mentioned cross bar and connected to the closed end of said bellows, and a flexible strap having strain gauges arranged to sense bending secured to both the inner and outer sides of said strap and connecting the ends of said cross bars and extending perpendicular to said cross bars.

References Cited in the file of this patent

UNITED STATES PATENTS

| | | |
|---|---|---|
| 2,059,549 | Carlson | Nov. 3, 1936 |
| 2,416,664 | Ruge | Feb. 25, 1947 |
| 2,423,867 | Zener et al. | July 15, 1947 |
| 2,470,714 | Nevius | May 17, 1949 |
| 2,471,601 | Albright | May 31, 1949 |

OTHER REFERENCES

Thesis: Aircraft Engineering, April 1943, pp. 106, 107 and 108.